US006859997B1

(12) United States Patent
Tong et al.

(10) Patent No.: US 6,859,997 B1
(45) Date of Patent: Mar. 1, 2005

(54) METHOD FOR MANUFACTURING A MAGNETIC WRITE ELEMENT

(75) Inventors: Lijun Tong, San Jose, CA (US); Kevin Lin, San Ramon, CA (US); Joyce Hsiang, San Ramon, CA (US); Yirong Hu, Sunnyvale, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 295 days.

(21) Appl. No.: 09/665,431

(22) Filed: Sep. 19, 2000

(51) Int. Cl.[7] ........................... G11B 5/127; H04R 31/00
(52) U.S. Cl. ............................. 29/603.13; 29/603.07; 29/603.13; 29/603.14; 29/603.15; 29/603.25; 360/121; 360/123; 360/126; 360/317; 427/127; 427/128; 261/22; 261/38; 261/41
(58) Field of Search .................... 29/603.07, 603.13, 29/603.14, 603.15, 603.2; 216/22, 38, 41; 360/121, 123, 126, 317; 427/127, 128

(56) References Cited

U.S. PATENT DOCUMENTS

| 4,102,683 A | 7/1978 | DiPiazza ..................... 96/38.4 |
| 4,652,954 A | 3/1987 | Church ....................... 360/120 |
| 4,684,438 A | 8/1987 | Lazzari ....................... 156/649 |
| 5,034,089 A | 7/1991 | Dee et al. .................... 156/633 |
| 5,045,417 A | 9/1991 | Okamoto ....................... 430/5 |
| 5,126,220 A | 6/1992 | Tokitomo et al. ............... 430/5 |
| 5,153,083 A | 10/1992 | Garofalo et al. .............. 430/5 |
| 5,414,580 A | 5/1995 | Levenson et al. ........... 360/123 |
| 5,448,822 A * | 9/1995 | Wu et al. ................. 29/603.24 |
| 5,515,221 A | 5/1996 | Gill et al. ................... 360/113 |
| 5,566,442 A | 10/1996 | Gaud et al. .............. 29/603.14 |
| 5,621,592 A | 4/1997 | Gill et al. ................... 360/113 |
| 5,649,351 A | 7/1997 | Cole et al. ............... 29/603.14 |
| 5,658,470 A | 8/1997 | Schultz et al. ................ 216/22 |
| 5,665,251 A | 9/1997 | Robertson et al. ............. 216/22 |
| 5,666,249 A | 9/1997 | Ohmori et al. ............. 360/123 |
| 5,681,426 A | 10/1997 | Schultz et al. ........... 156/654.1 |
| 5,695,656 A | 12/1997 | Park et al. ..................... 216/22 |
| 5,700,380 A | 12/1997 | Krounbi et al. ................ 216/22 |
| 5,729,887 A | 3/1998 | Irie ........................... 29/602.1 |
| 5,742,458 A | 4/1998 | Koike et al. ................. 360/113 |
| 5,779,923 A | 7/1998 | Krounbi et al. ................ 46/22 |
| 5,894,388 A | 4/1999 | Sato et al. ................... 360/126 |
| 6,226,149 B1 * | 5/2001 | Dill et al. .................... 360/126 |
| 6,304,414 B1 * | 10/2001 | Crue et al. .................. 360/126 |
| 6,515,826 B1 * | 2/2003 | Hsiao et al. ................. 360/126 |

FOREIGN PATENT DOCUMENTS

| JP | 61122910 A | * | 6/1986 | ............ G11B/5/31 |
| JP | 62173612 A | * | 7/1987 | ............ G11B/5/31 |

OTHER PUBLICATIONS

"Nonlinear, eddy current damped, thin–film write head model"; Klaassen, K.B.; Hirko, R.G.; Magnetics, IEEE Transactions on , vol.: 32, Issue: 5, Sep. 1996; pp.:3524–3526.*

* cited by examiner

*Primary Examiner*—A. Dexter Tugbang
*Assistant Examiner*—Paul Kim
(74) *Attorney, Agent, or Firm*—Haynes Beffel & Wolfeld LLP

(57) ABSTRACT

The present invention provides a magnetic write element for use in a magnetic data recording system such as a disk drive. The invention provides a method of manufacturing a well defined coil, which avoids the problem of shallow wall angle problems exhibited by prior art methods due to coil mask shrinkage during high temperature bake. A series of trenches are provided in the coil mask, the trenches being shallower than the coil pattern, and not extending completely through the coil pattern. During the high temperature baking process shrinkage of the coil mask will be absorbed by the trenches and not transferred to the coil pattern, preventing deformation of the coil wall portion of the mask.

10 Claims, 7 Drawing Sheets

METHOD FOR MANUFACTURING A MAGNETIC WRITE ELEMENT

FIELD OF THE INVENTION

The present invention relates to magnetic heads for use in computer data storage stems and more particularly to a method for manufacturing a write element having a well defined coil structure.

BACKGROUND OF THE INVENTION

Magnetic disk drives are used to store and retrieve data for digital electronic apparatus such as computers. In FIGS. 1A and 1B, a magnetic disk data storage system 10 of the prior art includes a sealed enclosure 12, a disk drive motor 14, one or more magnetic disks 16, supported for rotation by a drive spindle 18 of motor 14, and an actuator 20 including at least one arm 22, the actuator being attached to a pivot bearing 24. Suspensions 26 are coupled to the ends of the arms 22, and each suspension supports at its distal end a read/write head 28. The head 28 (which will be described in greater detail with reference to FIGS. 2A and 2B) typically includes an inductive write element and a sensor read element. As the motor 14 rotates the magnetic disk 16, as indicated by the arrow R, an air bearing is formed under the transducer 28 causing it to lift slightly off of the surface of the magnetic disk 16, or, as it is termed in the art, to "fly" above the magnetic disk 16. Various magnetic "tracks" of information can be written to and/or read from the magnetic disk 16 as the actuator 20 causes the head 28 to pivot in a short arc across a surface of the disk 16. The pivotal position of the actuator 20 is controlled by a voice coil 30, which passes between a set of magnets (not shown) to be driven by magnetic forces caused by current flowing through the voice coil 30.

With reference now to FIGS. 2A and 2B, the head 28 includes a read element 32 and a write element 34, both of which are built upon a substrate 36 (FIG. 2B). The substrate 36 is generally constructed of a ceramic material and accounts for the majority of the head 28. The write element 34 includes a magnetic yoke 38 through which passes an electrically conductive coil 40.

With reference to FIG. 2B, the read element includes a read sensor 42, which is embedded in a dielectric medium 44 and disposed between first and second shields 46, 48. The second shield 48 also serves as a first pole of the write element 34. The read sensor 42 senses changes in a magnetic field generated by a magnetic disk 16 passing adjacent to an air bearing surface (ABS) of the head 28 defined by a plane 50.

With reference still to FIG. 2B, the yoke 38 includes the first magnetic pole 48 and a second magnetic pole 52. The first and second poles 48, 52 are joined at one end at what has been referred to as a back-gap 54. At the other end, the poles 48, 52 are separated by a write gap 56. A layer of write gap material 58 sits atop the first pole 48. The thickness of the write gap material layer 58 determines the thickness of the write gap 56, and it is formed so as not to cover the first pole at the back gap 54. A first insulation layer 60 sits atop the write gap material layer, and in addition to not covering the back-gap 54, is formed to leave a portion of the write gap material layer 58 uncovered near the ABS plane 50.

With reference still to FIG. 2B, the conductive coil 40 is formed atop the first insulation layer 60. As can be seen with reference to FIG. 2A, the coil 40 extends beyond the edges of the yoke 38 and wraps around the back gap. The coil 40 includes a pair of contact pads 62, which are useful for applying an electric potential to cause an electrical current to flow through the coil 40. A second insulation layer, sometimes referred to as a "coil insulation layer" 64, covers the coil 40, insulating it from the second pole 52 as well as insulating the windings of the coil 40 from one another.

With reference still to FIG. 2B, when a current is caused to flow through the coil 40, a magnetic flux is induced in the yoke 38. This magnetic flux is interrupted by the write gap 56, which generates a magnetic field that fringes out from the write gap. This fringing magnetic field can be used to impart a magnetic data signal on a disk 16 passing thereby.

FIG. 2C is a cross sectional illustration of the head 28 in an intermediate stage of development. In order to form the coil 40 a seed layer of a conductive material must first be applied. The seed layer 66 is a very thin layer, preferably of copper, that provides a conductive base upon which the coil may be electroplated. Also, a mask 68 must be applied to the structure. This mask is usually constructed of a positive photoresist which is spun on and then patterned using photolithography. The photolithographic process involves exposing the photoresist to radiation in the desired coil pattern. The portions of the photoresist exposed to the radiation become hardened, while the unexposed portions do not and can later be washed away leaving the desired mask structure.

In order to ensure that the mask 68 maintains adhesion to the seed layer 66, the wafer must be baked. This baking step has become more important as heads have become smaller in an effort to decrease track width, and increase data density. The baking step involves heating the wafer to a temperature of 120 to 130 degrees Celsius. While this post develop baking process, initially used to harden printing plate photoresist, a similar baking process has subsequently been used to improve the performance of Diazoquinone-novolak (DQN) photoresist. Post develop bake process involves the thermochemical (thermolysis) reactions of the resin, sensitizer, and residual solvents with heat and air. Post develop bake removes most of the water molecules that are absorbed by the DQN photoresist films after developing and rinsing. With a baking temperature of 120 to 150 degrees Celsius, solvents and water molecules can be removed to improve the bonding between photoresist and substrate. It also reduces side effects in post processes. Furthermore, thermal stabilization can be achieved with intermolecular reactions between sensitizer and the resin. Plastic flow may occur with increasing bake temperature as inter difflusion between a silyated surface primer and the photoresist. The plastic flow overcomes the surface adhesive force, surface tension and the internal modulus force of the photoresist. The photoresist profile starts to round at corners and eventually the photoresist starts to flow with increasing bake temperature.

Unfortunately, as can be seen in FIGS. 2B and 2C, this baking step causes the photoresist to shrink, which results in a shallow wall angle 70 especially at the outermost turn of the coil pattern. This shallow wall angle results in a poorly defined coil 40 having a poorly defined, shallow wall angle at its outer edge 72 as can be seen in FIG. 2B. This shallow wall angle at the outer edge 72 of the coil 40 not only results in poor coil definition, but also leads to poor topography of the later applied second insulation layer 64 and second pole 52 (FIG. 2B). After the second pole has been constructed, the wafer is cut along line 74 FIG. 2C) to provide the ABS surface of plane 50 (FIG. 2B).

Therefore there remains a need for a method for manufacturing a write element that prevents the shallow wall angle formation on the coil. The method would preferably involve as few additional process steps as possible and would also allow a post develop bake to be employed for mask processing purposes.

SUMMARY OF THE INVENTION

The present invention provides a method for constructing a write element for use in a magnetic read write head of a data recording system. A magnetic first pole is provided, having a first end and a second end. Then, a dielectric write gap material is deposited over the first pole, formed such that a portion of the first pole near the second end remains uncovered, providing a back-gap. A mask material is deposited and patterned using a photolithographic process, and portions of the mask material are selectively removed to form a recess in a desired coil configuration, the recess extending through the mask to the seed layer. A trench is also formed in the mask, having a depth that is shallower than that of the coil recess. The mask is then baked, and an electrically conductive material is deposited to form the coil. Subsequently, the mask is removed and a coil insulation layer is deposited and cured. The second magnetic pole is then constructed so as to contact the first pole at the back-gap, and being separated from the first pole, opposite the back gap, by the write gap material.

The trenches formed in the coil mask advantageously provide stress relief so that when the mask shrinks during the baking process the side walls of the coil recess remain unaffected. The trench effectively breaks the tension created by the shrinkage, preventing the shrinkage from distorting the mask in the area of the coil pattern. This allows a well defined coil to be constructed with a beneficially vertical side wall. The present invention avoids the shallow wall angle exhibited by the coil of the prior art without significantly adding to the cost of manufacturing the head.

The present invention can include more than one trench, and can include several trenches disposed around the outer edges of the coil pattern. The trenches can be roughly between 3.5 and 0.5 microns wide, and can be spaced roughly 0.5 microns apart. They can be spaced a distance 0.8 microns or more from the outermost edge of the coil recess, however, the optimal distance will depend upon factors such as the size and shape of the coil pattern. The present invention can be used in construction of a head wherein the coil is electroplated. In such a case, a seed layer can be applied prior to depositing the coil mask. After forming the coil and removing the mask, the seed layer can be removed.

BRIEF DESCRIPTION OF THE FIGURES

The present invention will be readily understood by the following detailed description in conjunction with the accompanying drawings, with like reference numerals designating like elements.

DETAILED DESCRIPTION OF THE DRAWINGS

Figure 3:
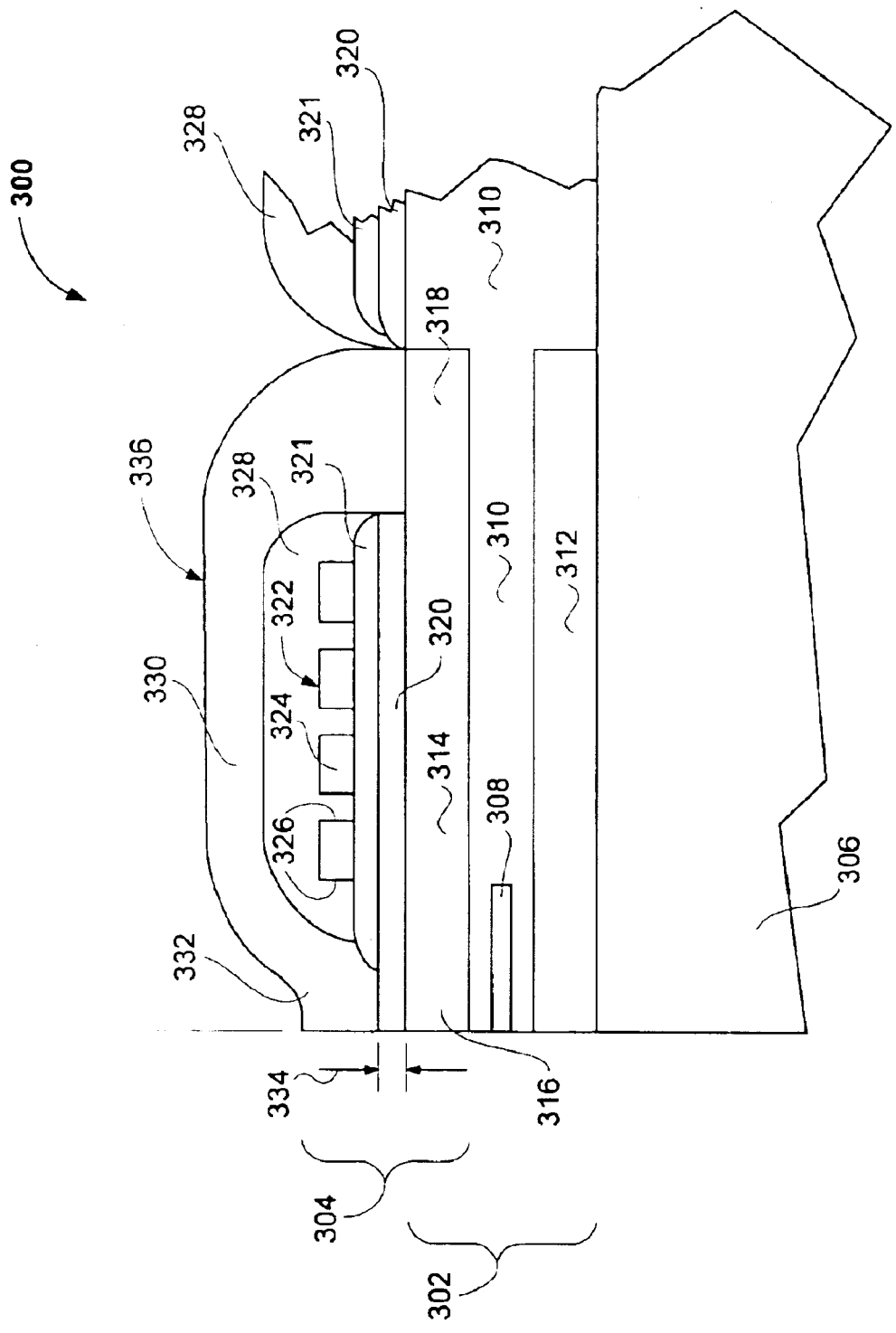
FIG. 3 is a partial cross-sectional view, similar to FIG. 2B showing a combination read/write head of the present invention.

With reference to FIG. 3, the present invention is embodied in a merged read/write head 300 having a read element 302, and a write element 304, both of which are built upon a substrate 306. The read element 302 includes a read sensor 308 embedded in a dielectric medium 310 between first and second shields 312, 314.

As discussed with reference to the background of the invention, the second shield 314 also functions as a first pole of the write element. Since the focus of the present invention is embodied in the write element 304, the second shield/first pole 314 will hereafter be referred to as the first pole 314. The second pole 314 has an end that defines a pole tip region 316 and an opposite end that defines a back gap region 318. A layer of dielectric write gap material 320 covers the first pole 314 and extends beyond the edges of the first pole 314 to rest atop of the dielectric layer 310. The write gap material layer 320 is formed to leave a portion of the first pole 314 uncovered in the back-gap region 318.

With reference still to FIG. 3, a first insulation layer 321 is formed over the write gap material layer. The first insulation layer 321 is preferably constructed of photoresist, which is spun onto the write gap layer. The photoresist is spun onto the structure, then patterned and lifted off to leave a portion of the write gap layer 320 exposed near the pole tip portion 316 of the first pole 314, and also to leave the back gap 318 of the first pole 314 exposed. Alternatively, the first insulation layer can be $Al_2O_3$. With continued reference to FIG. 3, an electrically conductive coil 322 is formed on top of the first insulation layer. The coil 322 is formed with a plurality of windings 324 all of which have well defined, vertical side walls 326. This is in contrast to the shallow wall angle produced by prior art methods as discussed previously. These well defined windings allow the coil 322 to be formed with a smaller pitch, thereby allowing the head 300 to be constructed smaller than would otherwise be possible while maintaining the magnetic performance of the head 300.

A second insulation layer or "coil insulation layer" 328 covers the coil 322. The coil insulation layer 328 is preferably constructed of photoresist, although other dielectric materials could be used as well. The coil insulation layer 328 is formed by the process described with reference to the first insulation layer so as to leave a portion of the write gap material layer 320 uncovered in the area adjacent the first pole tip 316, as well as leaving the back-gap portion 318 of the first pole 314 uncovered. A curing process, which will be discussed in more detail below, leaves the insulation layer 328 formed with smoothly tapered edges.

Figure 1A:
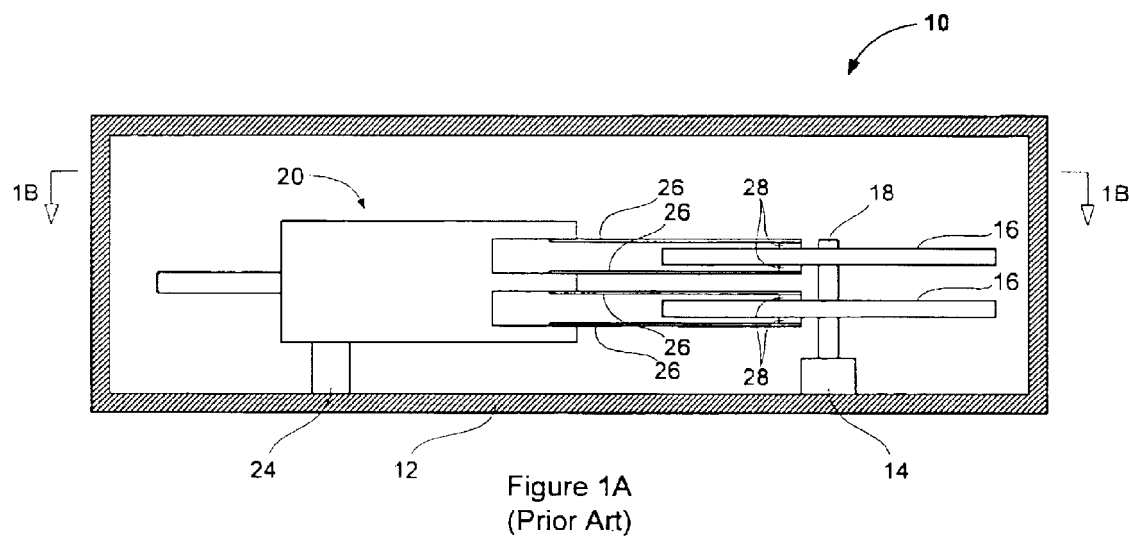
FIG. 1A is a partial cross-sectional front elevation view of a magnetic data storage system of the background art.
Figure 1B:
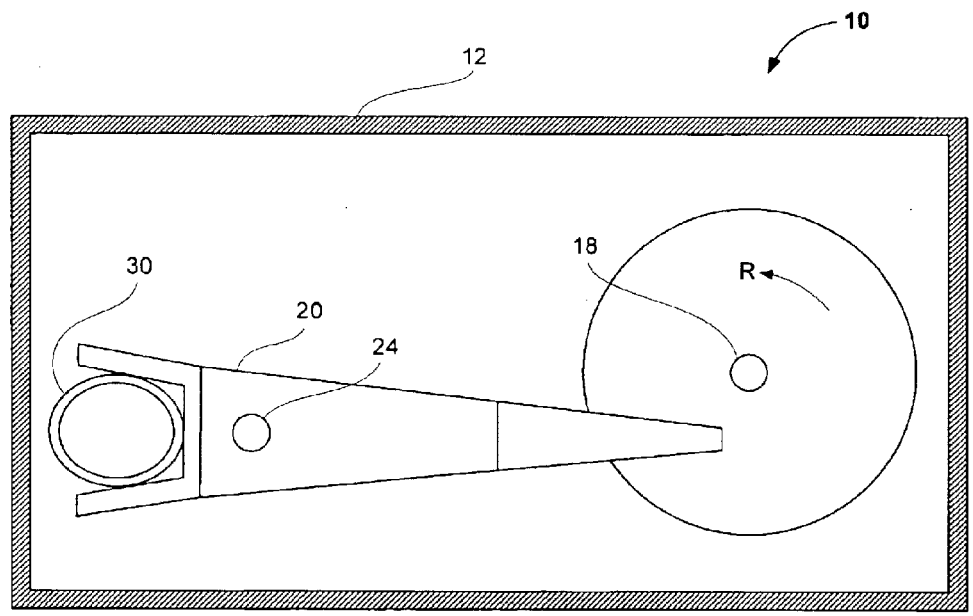
FIG. 1B is a top plan view of the background art taken along line 1B—1B of FIG. 1A.
Figure 2A:
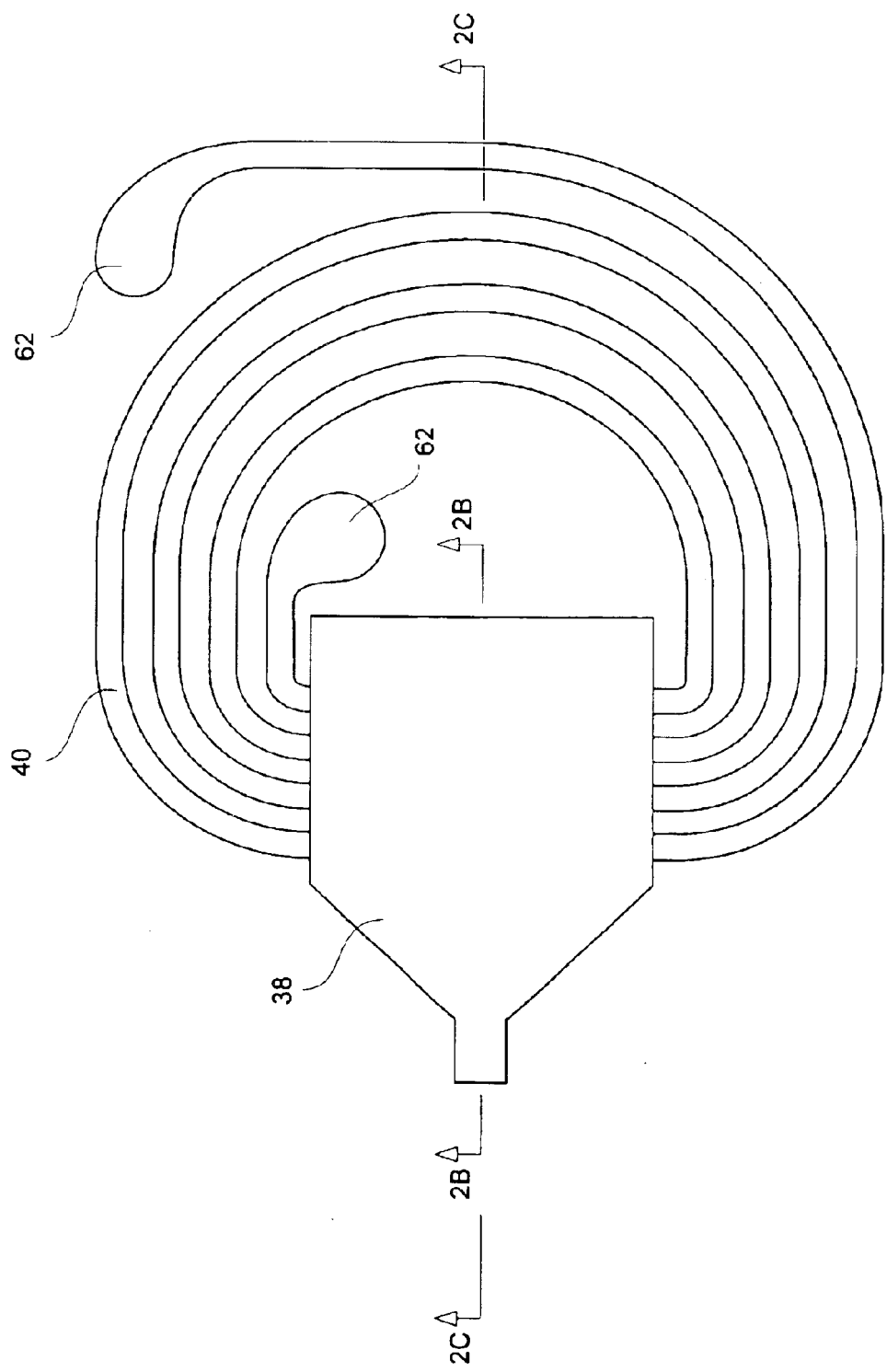
FIG. 2A is a is a view of the background art taken from line 2A—2A of FIG. 1B, shown greatly enlarged and rotated 180 degrees.
Figure 2B:
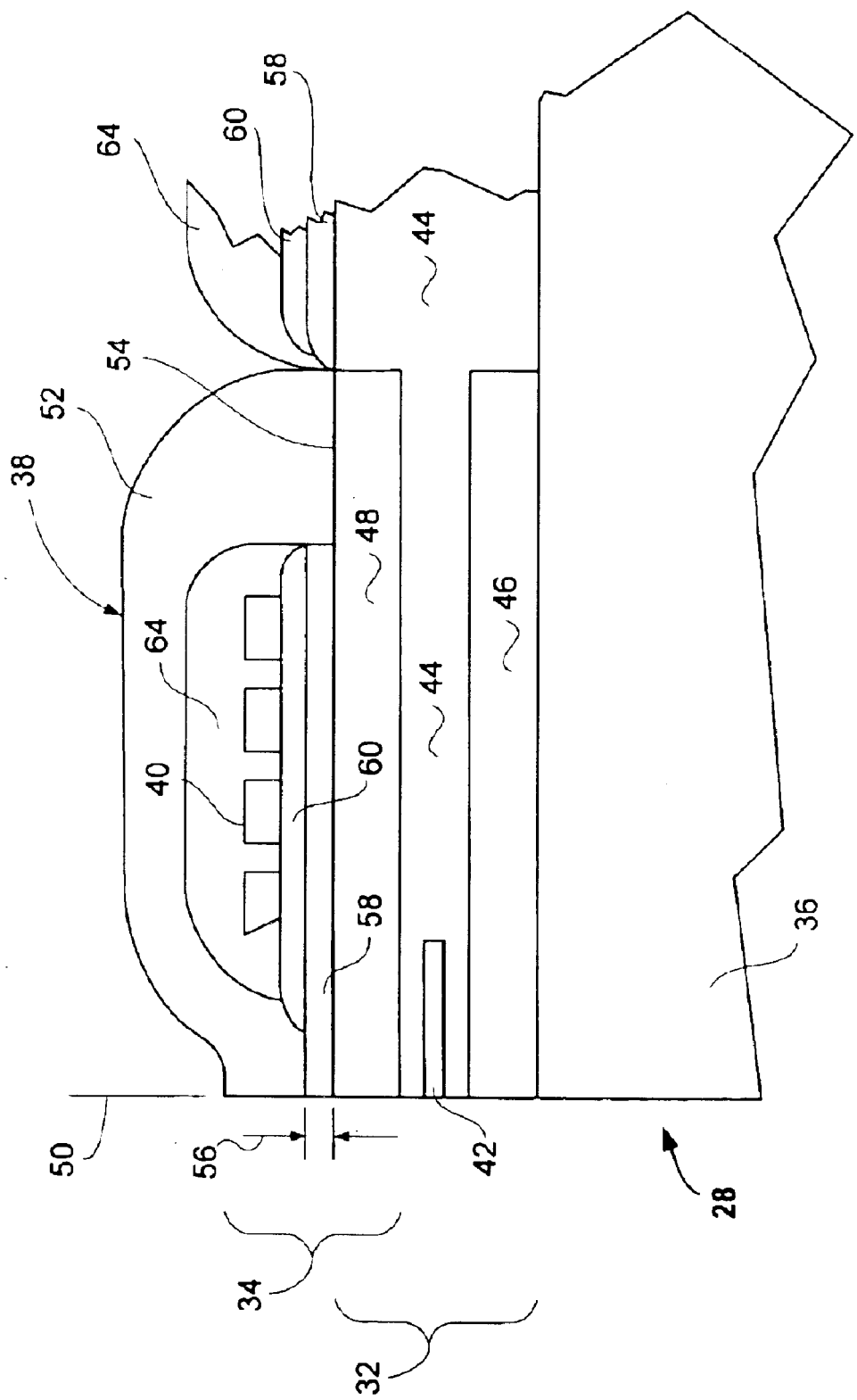
FIG. 2B is a view of the background art taken from line 2B—2B of FIG. 2A, shown enlarged.
Figure 2C:
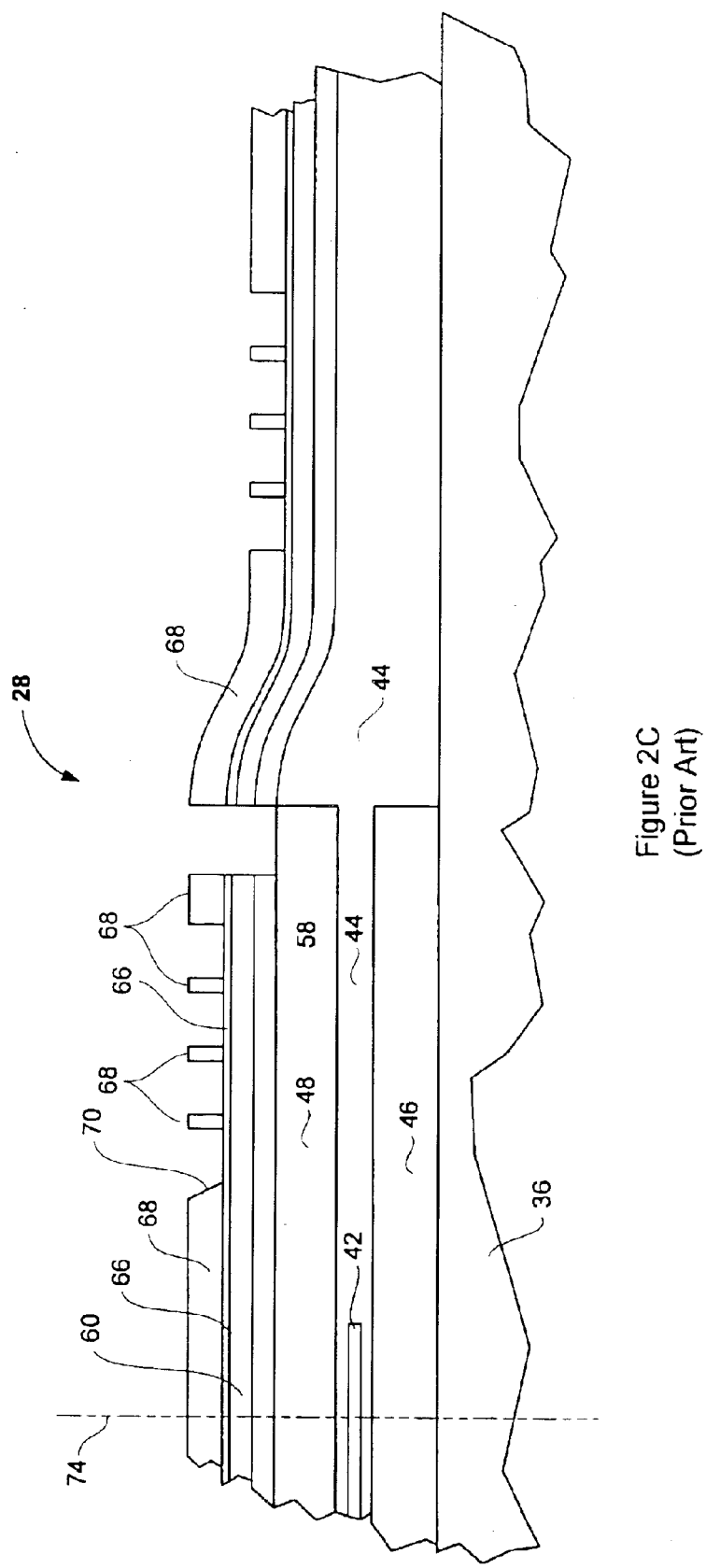
FIG. 2C is a view of the background art taken from line 2C—2C of FIG. 2A.

A second magnetic pole 330 is formed on top of the coil insulation layer and the first pole 314. The second pole 330 is preferably constructed of a high magnetic moment material such as $Ni_{45}Fe_{55}$, which can be deposited by electroplating. Attentively, the second pole can be formed of another high magnetic moment material and can be deposited by sputtering if the material cannot be plated. The second pole 330 has a pole tip 332, which is separated from the pole tip 316 of the first pole by the write gap material layer 320, thereby forming a write gap 334 therebetween. Opposite its pole tip 332, the second pole 330 connects with the first pole 314 in the back-gap region 318. Together the first and second poles 314, 330 collectively form a magnetic yoke 336. When a current is caused to flow through the coil 322, a magnetic flux is induced in the yoke 336. This magnetic flux, being interrupted by the write gap 334, generates a magnetic field which fringes out from the write gap 334. This magnetic field is referred to in the art as a fringing field and can be used to impart magnetic data onto a disk 16 (FIGS. 1A, 1B) passing near the write gap 334.

Figure 4:
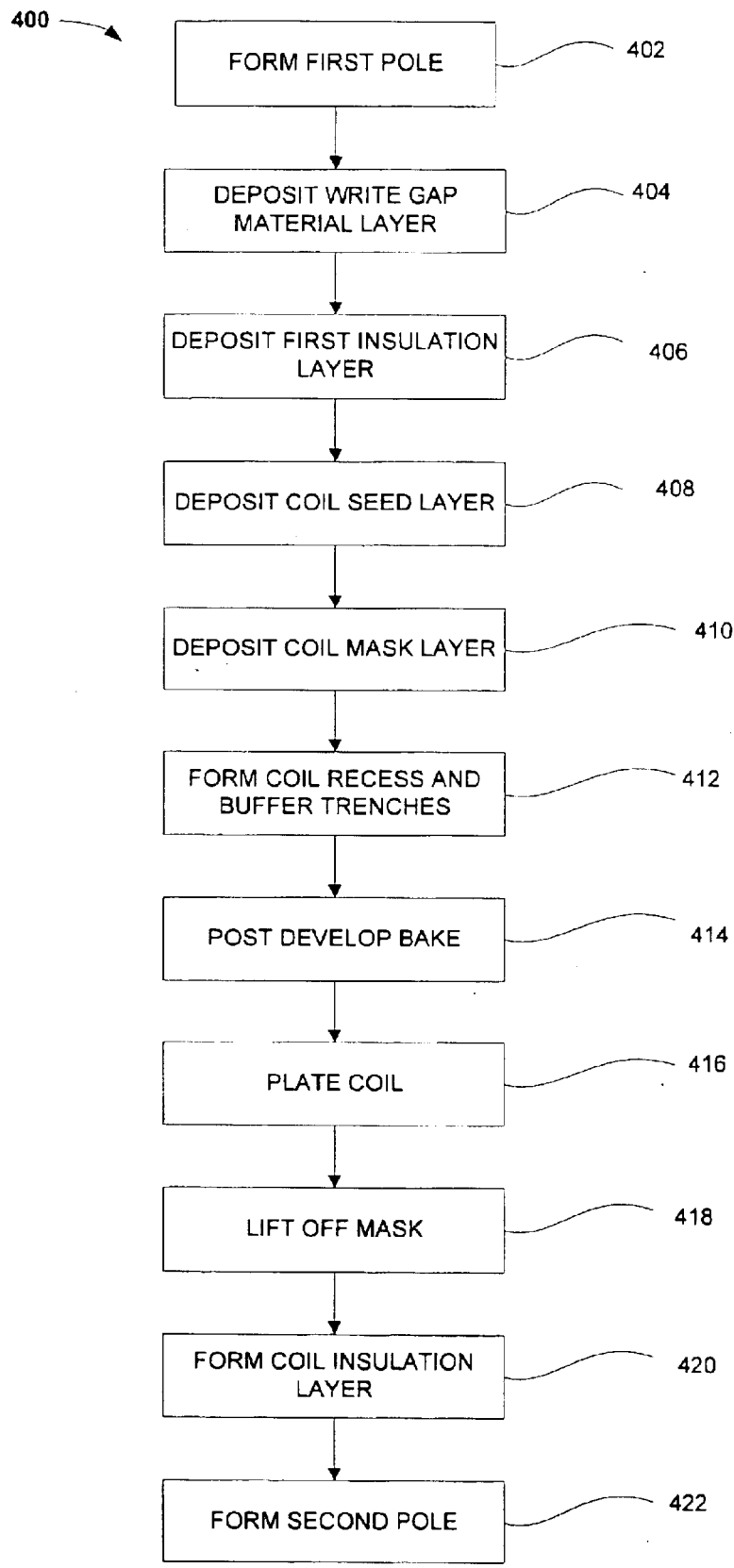
FIG. 4 is a flowchart of a process for manufacturing a head of the present invention.

With reference to FIG. 4, a process 400 for constructing a head 300 having windings 324 with well defined vertically sloping side walls will be described. In a step 402, the first pole 314 is formed. The first pole 314 is preferably constructed of permalloy and is deposited by electroplating, however other magnetic materials and deposition methods can be used as well. The deposited first pole is then planarized using a chemical mechanical polishing process to produce a smooth flat upper surface. Then, in a step 404 a layer of dielectric write gap material is deposited. The write gap material layer is preferably $Al_2O_3$ and is sputter deposited. The write gap material layer is patterned using photolithography and etching as will be familiar to those skilled in the art to leave the back-gap portion 318 of the first pole 314 uncovered. Thereafter, in a step 406 the first insulation layer 321 is deposited. The first insulation layer 321 is preferably constructed of photoresist, which is formed to leave the back-gap portion 318 of the first pole 314 uncovered as well as a portion of the write gap material 320 near the pole tip portion 316 of the first pole 314. The first insulation layer is formed by first exposing the photoresist in the desired pattern, and then lifting off the parts to be exposed.

Figure 5:
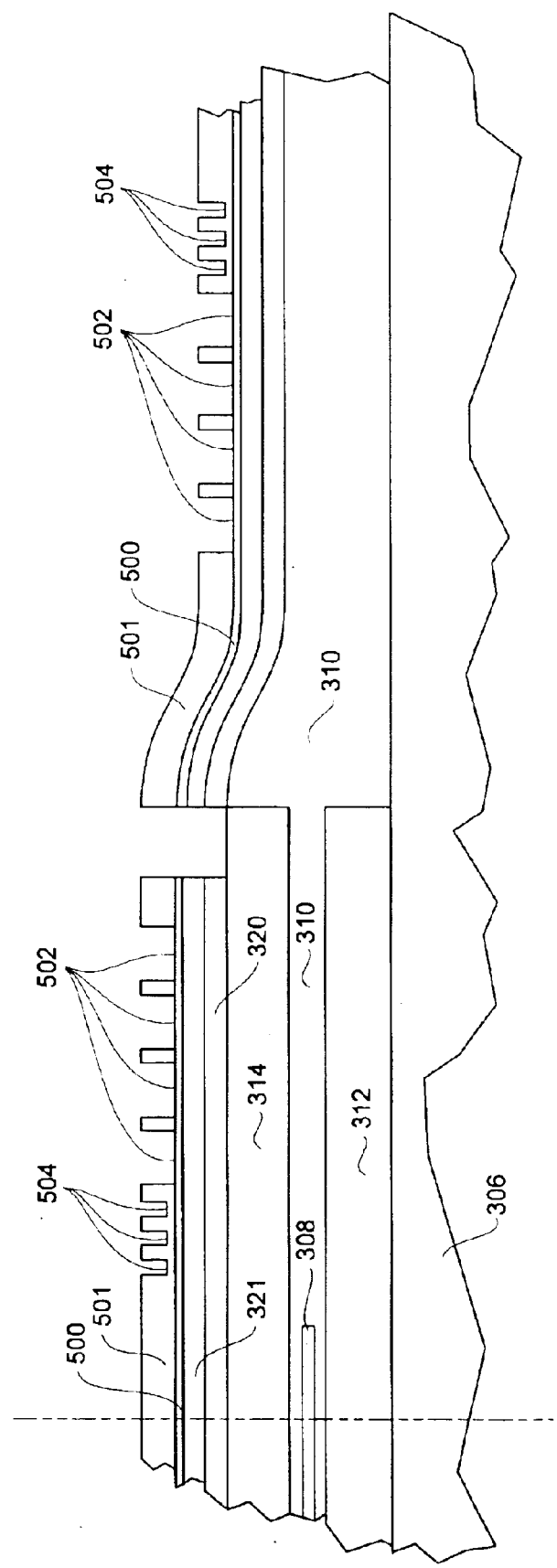
FIG. 5 is a partial cross sectional view, similar to FIG. 2C, showing the combination read/write head of the present invention.

Thereafter in a step 408, a thin, electrically conductive seed layer 500 is deposited. The seed layer, which can be more clearly understood with reference to FIG. 5, is preferably a sputter deposited alloy containing chromium and copper, however it can be any suitable electrically conductive material. In a step 410 a coil mask layer 501 is deposited. The mask is preferably a photoresist material. In a step 412, a photolithographic process is used to form a coil recess 502 in the pattern of the coil 322, and also to form a series of buffer trenches 504 adjacent the outer edge of the coil pattern. The coil recess 502 and the buffer trenches 504 are shown in cross section in FIG. 5. The coil recess 502 extends completely through the coil mask layer 500 to the coil seed layer 500 thereunder, which was previously deposited in step 408. The buffer trenches 504 do not extend entirely through the coil mask layer. The different depth of the trenches 504 as compared with the depth of the coil recess can be achieved by making the trenches 504 narrower than the coil insulation layer, and the depth of the trenches 504 can be controlled by controlling their width. Preferably, the depth of the trench is about 80% of the depth of the coil recess 502.

Then, in a step 414 the mask material is baked. The baking step is necessary to ensure proper adhesion of the mask 501 to the seed layer 500. Shrinkage of the mask during the baking step would ordinarily cause the outermost wall of the coil recess 502 to slant away from the center of the coil, leading to a poorly defined coil pattern. However, the presence of the buffer trenches prevents this distortion of the wall of the coil recess 502 by providing a stress relief mechanism. As the mask 500 shrinks, the walls of the buffer trenches 504 distort without transferring the shrinkage stresses to the coil recess 502 of the coil mask 501, thereby leaving the walls of the coil recess 502 undisturbed.

Thereafter, in a step 416 the coil 322 is formed by electroplating. The coil 322 is preferably formed of an alloy of chromium and copper, and as will be appreciated by those skilled in the art, will only form at locations where the seed layer 500 is exposed. Therefore, the coil will only form in the coil recess 502. In a step 418 the mask is lifted off leaving the coil 322. Thereafter, in a step 420 the coil insulation layer 328 is formed. The coil insulation layer 328 is formed by methods familiar to those skilled in the art, which include first spinning on a photoresist, then patterning the photoresist by photolithography and lifting off portions of the photoresist at the location of the back-gap 318 and pole tip 316. The coil insulation layer is then cured by exposing it to an elevated temperature which causes it to harden and to form smoothly tapered edges.

Then, in a step 422 the second pole is formed. The second pole 330 can be formed of $Ni_{45}Fe_{55}$ which can be deposited by electroplating. The second pole 330 can also be formed of other suitable magnetic materials and if constructed of a material that cannot be electroplated, can be sputter deposited.

Although the foregoing invention has been described in some detail for purposes of clarity of understanding, it will be apparent that certain changes and modifications may be practiced within the scope of the appended claims. For example, the write element could be constructed to have multiple coils. In addition, the first pole could be formed with a pedestal, constructed of a high magnetic moment material and could include a planarized first insulation layer having an upper surface that is flush with the upper surface of the pedestal. It is also contemplated that the present invention could be used to construct a write element wherein the coil is not electroplated, but is deposited by some other method such as sputtering. Accordingly, the present embodiments are to be considered as illustrative and not restrictive, and the invention is not to be limited to the details given herein, but may be modified within the scope and equivalents of the appended claims.

What is claimed is:

1. A method for manufacturing a magnetic write element for use in a data recording system, comprising the steps of:
   a. providing a first pole having a first and a second end and constructed of a magnetic material;
   b. depositing a dielectric write gap material layer over said first pole, said dielectric write gap material layer extending to said first end of said first pole and being formed so as to leave a portion said first pole uncovered at said second end of said first pole to provide a back-gap;
   c. depositing a mask material;
   d. patterning a coil pattern in said mask material using a photolithographic process;
   e. selectively removing a portion of said patterned mask material to produce a recess in said mask material in said pattern of said coil;
   f. forming a trench in said mask material adjacent said coil pattern, said trench having a depth that is shallower than a depth of said coil pattern recess;
   g. baking said mask material;
   h. depositing an electrically conductive coil into said coil pattern recess;
   i. removing said mask material;
   j. depositing a coil insulation layer;
   k. curing said coil insulation layer; and
   l. forming a second pole constructed of a magnetic material, said second pole contacting said first pole at said back-gap, and being separated from said first pole at said first end by said write gap material layer.

2. The method as recited in claim 1 wherein said electrically conductive coil is electroplated and further comprising the steps of:

a. before depositing said mask material, depositing a thin, electrically conductive seed layer;

b. after depositing said electrically conductive coil, removing said seed layer.

3. The method as recited in claim 2 wherein said coil material and said seed layer are copper.

4. The method as recited in claim 1 wherein said trench extends around said coil patterned recess in said mask.

5. The method as recited in claim 1 further comprising two or more of said trenches.

6. The method as recited in claim 1 wherein said trench has a width of 0.3 to 0.5 microns.

7. The method as recited in claim 5 wherein said trenches are spaced roughly 0.5 microns apart.

8. The method as recited in claim 1 wherein said trench is spaced at least 0.8 microns from an outermost portion of said coil patterned recess in said mask material.

9. The method as recited in claim 1 wherein said coil has a pitch of at least 0.4 microns.

10. The method as recited in claim 1 wherein said coil patterned recess in said mask material extends through said mask material, and wherein said trench does not extend through said mask material.

\* \* \* \* \*